(12) United States Patent
Chang

(10) Patent No.: US 8,965,847 B1
(45) Date of Patent: Feb. 24, 2015

(54) INDEPENDENT SYNCHRONIZATION OF FILE DATA AND FILE METADATA

(75) Inventor: Peter C. Chang, Union City, CA (US)

(73) Assignee: Oxygen Cloud, Inc., Redwood City, CA (US)

(*) Notice: Subject to any disclaimer, the term of this patent is extended or adjusted under 35 U.S.C. 154(b) by 46 days.

(21) Appl. No.: 13/284,485

(22) Filed: Oct. 28, 2011

(51) Int. Cl.
*G06F 7/00* (2006.01)
*G06F 17/00* (2006.01)

(52) U.S. Cl.
USPC .......................................... 707/621; 707/615

(58) Field of Classification Search
CPC ............ G06F 11/1658; G06F 11/1675; G06F 11/2056; G06F 11/30
See application file for complete search history.

(56) References Cited

U.S. PATENT DOCUMENTS

| | | | |
|---|---|---|---|
| 5,276,867 A * | 1/1994 | Kenley et al. ........................ | 1/1 |
| 6,324,544 B1 * | 11/2001 | Alam et al. ............................ | 1/1 |
| 6,466,951 B1 * | 10/2002 | Birkler et al. .......................... | 1/1 |
| 2003/0182327 A1 * | 9/2003 | Ramanujam et al. ......... | 707/204 |
| 2004/0250034 A1 * | 12/2004 | Yagawa et al. ................ | 711/162 |
| 2005/0015662 A1 * | 1/2005 | Scanlan ......................... | 714/13 |
| 2005/0033561 A1 * | 2/2005 | Orofino, II ....................... | 703/1 |
| 2005/0060741 A1 * | 3/2005 | Tsutsui et al. .................. | 725/32 |
| 2005/0192973 A1 * | 9/2005 | Sperling et al. ............... | 707/100 |
| 2006/0069809 A1 * | 3/2006 | Serlet ............................ | 709/248 |
| 2006/0190500 A1 * | 8/2006 | Rao et al. ..................... | 707/203 |
| 2006/0190506 A1 * | 8/2006 | Rao et al. ..................... | 707/204 |
| 2006/0206533 A1 * | 9/2006 | MacLaurin et al. .......... | 707/200 |
| 2006/0248232 A1 * | 11/2006 | Chasman et al. ............. | 709/248 |
| 2006/0253485 A1 * | 11/2006 | Bangel et al. ................. | 707/102 |
| 2007/0088754 A1 * | 4/2007 | Brannon et al. .............. | 707/200 |
| 2007/0112890 A1 * | 5/2007 | Murase ........................ | 707/204 |
| 2007/0179995 A1 * | 8/2007 | Prahlad et al. ................ | 707/202 |
| 2008/0005184 A1 * | 1/2008 | Myllyla et al. ................ | 707/200 |
| 2008/0091669 A1 * | 4/2008 | Anderson et al. ................. | 707/5 |
| 2009/0112880 A1 * | 4/2009 | Oliveira et al. .................. | 707/10 |
| 2009/0216815 A1 * | 8/2009 | Braginsky et al. ............ | 707/203 |

FOREIGN PATENT DOCUMENTS

| | | | |
|---|---|---|---|
| WO | WO 96/18941 | * | 6/1996 |
| WO | WO 9718519 | * | 5/1997 |
| WO | WO 2009015049 A2 | * | 1/2009 |
| WO | WO 2009134548 A2 | * | 11/2009 |

OTHER PUBLICATIONS

Metadata management for federated databases, Ordonez et al, Proceedings of the ACM first workshop on CyberInfrastructure, p. 31-38, 2007.*
Syxaw: Data synchronization middleware for the mobile web, Lindholm et al, Mobile Network Application, pp. 661-676, 2009.*

* cited by examiner

*Primary Examiner* — Augustine K Obisesan
(74) *Attorney, Agent, or Firm* — Kilpatrick Townsend & Stockton LLP

(57) ABSTRACT

A method including storing a first data object and metadata associated with the first data object at a computing device, storing metadata at the computing device for which a second data object associated with the metadata is not stored at the computing device, and displaying, in the appearance of a single file system, information identifying both the first data object and the second data object.

14 Claims, 13 Drawing Sheets

INDEPENDENT SYNCHRONIZATION OF FILE DATA AND FILE METADATA

BACKGROUND

Embodiments of the present invention relate to the synchronization of files over a network, and in particular to the independent synchronization of file data and file metadata.

Various types of file management systems for managing and manipulating files that are stored on a local device are in widespread use today. For example, one of the most well-known types of file management system is that used by the Windows™ operating system by Microsoft Corp. of Redmond, Wash. Among numerous other things, by using the Windows™ operating system provided on a particular device, it is possible to view, modify, and otherwise manage files (such as images, videos, documents, etc.) stored on that device. It is also possible to do the same with files stored on other remote devices (such as files stored on a Network Attached Storage device, a USB memory stick, etc.), where the files provided on the remote devices are independent of the files provide on the device which the operating system is installed.

Further, various types of file management systems for managing and manipulating files that are stored on a remote device are also in use today. For example, iManage WorkSite™ by Smart Solutions, Inc. of Cleveland, Ohio provides users having client devices with the ability to access and manipulate documents that are remotely stored. By running remote access software on the client devices, the users can view documents stored in the remote depository, 'check out' the document so that other users can not edit the document, and perform editing of the document using the client device whereby changes are stored at the remote depository for other users to engage. For another example, Dropbox™ by Dropbox, Inc. of San Francisco, Calif. provides cloud storage by which users can copy data between computers having the Dropbox™ software installed and share data with others. To do so, a networked folder is provided on the user's computer, and any data that the user moves to that networked folder is synchronized with remote servers. The user may then access the data on the remote servers from another device having the Dropbox™ software installed or share the data on the remote servers with others by sending a link to a website where the other individuals may download the data.

While the past advances in file management systems have been significant, the file management systems available today still suffer from numerous deficiencies. For example, the systems providing remote document management such as iManage Worksite™ fail to integrate well with the file management systems of the operating systems running on the client devices such as Windows™. For another example, when large files are provided for access via a remote server, the required synchronization of those files is often bandwidth intensive and time consuming. For yet another example, with cloud storage services such as Dropbox™, files are either fully synchronized (between a user's computer and the remote server) or only stored locally. There is no provision or flexibility for a user to interact with files that are stored remotely but not locally. As a result, for such cloud storage services, any file viewed within the context of those services must, at the very minimum, be stored locally.

Accordingly, known file management systems are plagued with deficiencies. The management of locally stored files is disjointed with the management of synchronized files, the management of files that are only stored remotely non-existent, and the necessary synchronization of files potentially debilitating. These deficiencies result in a less than desirable user experience.

BRIEF SUMMARY

Embodiments of the present invention overcome some or all of the aforementioned deficiencies in the related art. According to some embodiments, methods include storing a first data object and metadata associated with the first data object at a computing device, storing metadata at the computing device for which a second data object associated with the metadata is not stored at the computing device, and displaying, in the appearance of a single file system, information identifying both the first data object and the second data object.

In one embodiment, the methods may also include displaying, in the appearance of the single file system, a first indicator indicating that the first data object is stored at the computing device and a second indicator different from the first indicator indicating that the second data object is not stored at the computing device.

In another embodiment, the methods may include receiving a user selection to unsynchronize the first data object, and in response to receiving the user selection to unsynchronize the first data object, freeing at least some of the storage space of the computing device consumed by the first data object. In one embodiment, the metadata associated with the first data object may be retained on the computing device after freeing at least some of the storage space consumed by the first data object.

In some embodiments, the methods may include receiving a user selection synchronize the second data object, and in response to receiving the user selection to synchronize the second data object, communicating a request for the second data object to a remote computing system. In one embodiment, the methods may also include receiving the second data object from the remote computing system and, in response to receiving the second data object, displaying, in the appearance of the single file system, an indicator indicating that the second data object is stored at the computing device.

Embodiments of the present invention may also include a computing device. The computing device may include a storage device operable to store a first data object and metadata associated with the first data object, and operable to store metadata for which a second data object associated with the metadata is not stored at the computing device. The computing device may also include a display device for displaying information to a user of the computing device, and a processor for causing the display device to display, in the appearance of a single file system, information identifying both the first data object and the second data object.

For a more complete understanding of the nature and advantages of embodiments of the present invention, reference should be made to the ensuing detailed description and accompanying drawings. Other aspects, objects and advantages of the invention will be apparent from the drawings and detailed description that follows. However, the scope of the invention will be fully apparent from the recitations of the claims.

DETAILED DESCRIPTION

Figure 1:
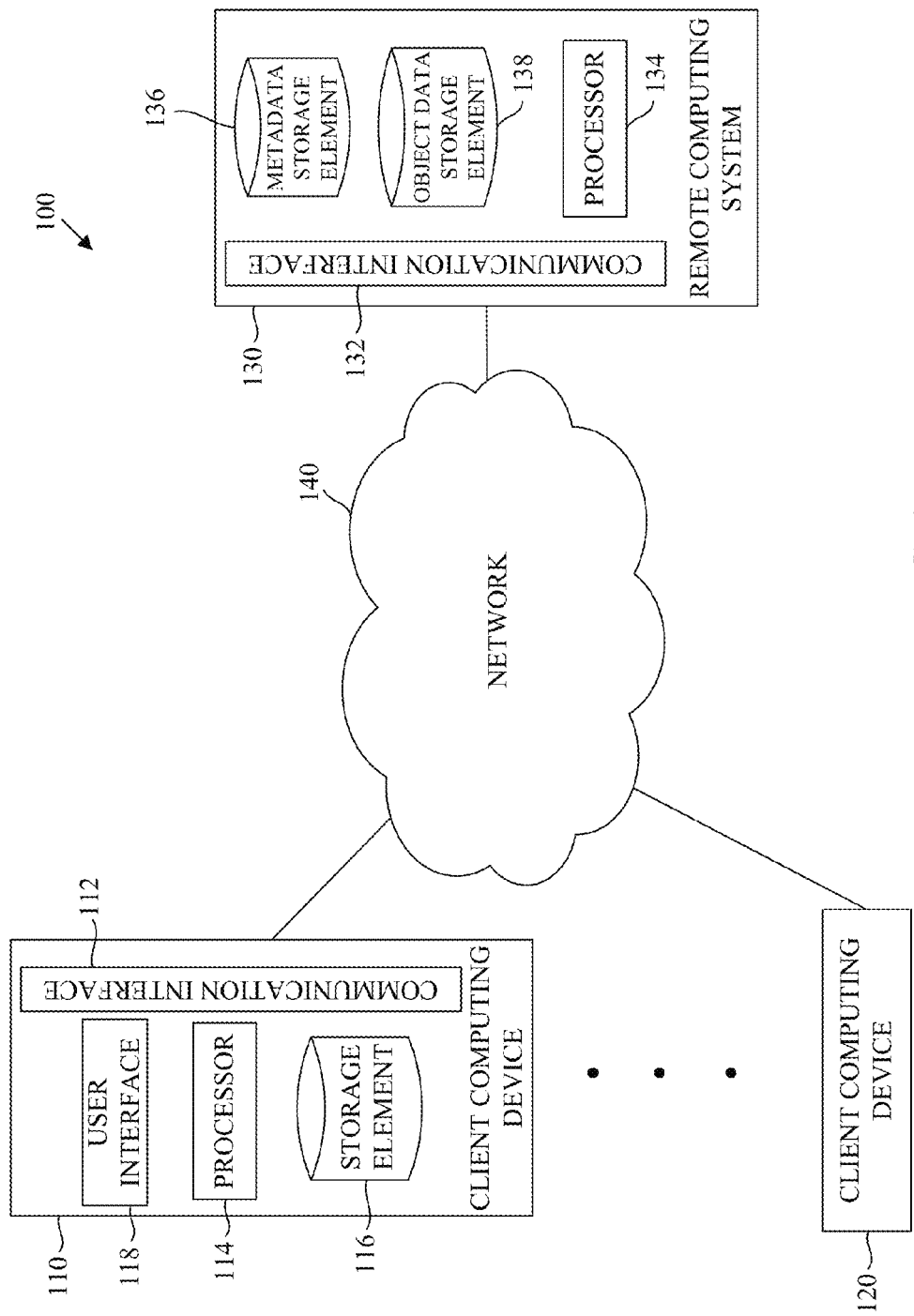
FIG. 1 is a simplified system illustrating an environment operable to implement aspects of one or more of the embodiments disclosed herein.

Embodiments of the present invention generally relate to the synchronization of files over a network. With the increasing prevalence and use of 'cloud computing', whereby an individual's resources are stored remotely rather than locally, there is an increasing desire to (at least visually) integrate the remotely stored resources with resources that are locally stored at the individual's computing device. According to various embodiments, methods, systems, and apparatus are provided whereby both files stored locally on a computing device as well as files stored remotely on a remote computing device appear to be integrated into a single file system. That is, to the user of the computing device, a graphical user interface is provided in which both the files stored locally and those stored remotely appear to be in the same file system. In so doing, the ease of interacting with resources, regardless of where the resource may actually be stored, may advantageously be increased, thereby advantageously increasing the portability of data and the computing devices used to engage that data.

In providing the appearance of a unified file system for both locally and remotely stored data, metadata and object data may be independently synchronized. In general, each data file, such as a JPEG-encoded image file, includes both object data (e.g., data representing the encoded image) and metadata (e.g., the time of file creation, the author of the file, the version of the file, etc.). Embodiments of the present invention may operate to independently synchronize the object data and the metadata between a client device and a remote server. By providing such an independent synchronization, metadata may be stored on the client device without storing the corresponding object data. In this fashion, the client device can provide information to the user of the device regarding the file associated with the metadata even though the data object is not stored on the client device. Further, in some embodiments, where a third party accesses the data object stored on the remote server, changes to the data object and thus metadata may be communicated to the user of the client device, such that the user may be made aware of changes to the remotely stored data object without actually storing the data object on the client device.

The client device may provide the user with indications as to whether a particular data object is synchronized (i.e., stored both locally and remotely) or unsynchronized (i.e., only stored remotely). For example, files for which the data objects are only stored remotely may be displayed to the user using a generic icon, and in some cases may have an additional filename extension such as "cloud". Files for which the data objects are stored both locally and remotely may be displayed to the user using a custom icon, where the custom icon may be based at least in part on the data object itself. For example, where the file is an image file, a thumbnail of the image may be displayed. In some cases, a checkmark or other graphical indicator may also or alternatively be used to indicate that the file is synchronized and/or a name of the file may be changed based on whether the file is synchronized.

In some embodiments, the user of the client device may choose to synchronize or unsynchronize any of the files displayed to the user. For example, if a file is shown to the user as being unsynchronized (only stored remotely), the user may synchronize the file whereby the data object for the file is subsequently acquired by the client device. Changes to the data object by the user may then be communicated to the remote device, and similarly, changes to the data object stored on the remote device may be communicated to the client device. For another example, if a file is shown to the user as being synchronized, the user may unsynchronize the file whereby the data object stored on the client device may be removed. In this case, while the user may not modify the data object or directly view changes to the data object stored at the remote device, changes to the metadata stored on the remote device may be communicated to the client device and changes to the metadata by the user may be communicated to the remote device.

Referring now to the drawings, in which like reference numerals represent like parts throughout the several views, FIG. 1 provides a simplified system 100 illustrating an environment operable to implement aspects of one or more of the embodiments disclosed herein. System 100 includes one or more client computing devices 110-120 and a remote computing system 130 all interconnected via a network 140.

Client computing devices 110-120 may include any suitable electronic computing devices, such as a mobile phone, a personal digital assistant (PDA), a handheld or portable device (iPhone, Blackberry, etc.), a notebook, personal computer, note pad or other electronic device configured for wired or wireless communication. At least some of client computing devices 110-120 may be associated with end users having a desire to access and/or manipulate files stored on a client computing device 110 and/or remote computing system 130.

Client computing devices 110-120 may include any suitable components typically found in such electronic device necessary to perform the operations discussed herein. In one embodiment and as illustrated in FIG. 1, a client computing device 110 includes a communication interface 112, a processor 114, a tangible non-transitory computer readable storage element 116, and a user interface 118. Communication interface 112 is any suitable interface or interfaces operable to enable communication between client computing device 110 and other elements of system 100, such as remote computing system 130. Processor 114 is any suitable computing processor or processors operable to execute instructions that cause client computing device 110 to perform one or more of the operations discussed herein. For example, processor 114 may execute software code stored in one or more storage elements such as storage element 116. Storage element 116 may be any storage element or storage elements suitable for storing data, software code, and other information used by client computing device 110. For example, storage element 116 may include one or more of random access memory (RAM), read only memory (ROM), electrically-erasable programmable read only memory (EEPROM), a hard disk, an optical disk, etc. User interface 118 may include one or more elements for receiving input from a user and providing outputs to the user. For example, user interface 118 may include a keypad, a display, a touch screen, or a combination thereof.

Remote computing system 130 may be any suitable electronic computing device or system of electronic computing devices operable to store and disseminate data files including data objects and metadata. In some embodiments, remote computing system 130 may be a plurality of networked computing devices whereby portions of the data files are stored on one or more of the computing devices. For simplicity, remote computing system 130 is shown and discussed as a single computing device, although a person of ordinary skill in the art would recognize that remote computing system 130 may be implemented as a plurality of devices and/or storage elements.

Remote computing system 130 may include any suitable components typically found in such systems necessary to perform the operations discussed herein. In one embodiment and as illustrated in FIG. 1, remote computing system 130 includes a communication interface 132, a processor 134, a tangible non-transitory computer readable metadata storage element 136, and a tangible non-transitory computer readable object data storage element 138. Communication interface 132 is any suitable interface or interfaces operable to enable communication between remote computing system 130 and other elements of system 100, such as one or more of client computing devices 110-120. Processor 134 is any suitable computing processor or processors operable to execute instructions that cause remote computing system 130 to perform one or more of the operations discussed herein. For example, processor 134 may execute software code stored in one or more storage elements such as metadata storage element 136 and/or object data storage element 138. Metadata storage element 136 and object data storage element 138 may be any storage element or storage elements suitable for storing data, software code, and other information used by remote computing system 130. For example, metadata storage element 136 and/or object data storage element 138 may include one or more of random access memory (RAM), read only memory (ROM), electrically-erasable programmable read only memory (EEPROM), a hard disk, an optical disk, etc. While shown as being separate elements, in some embodiments, metadata storage element 136 and object data storage element 138 may comprise a single data storage element.

Network 140 is any suitable network for enabling communications between various entities, such as between client computing devices 110-120 and remote computing system 130. Such a network may include, for example, a local area network, a wide-area network, a virtual private network, the Internet, an intranet, an extranet, a public switched telephone network, an infrared network, a wireless network, a wireless data network, a cellular network, or any other such network or combination thereof. The network may, furthermore, incorporate any suitable network topology. Examples of suitable network topologies include, but are not limited to, simple point-to-point, star topology, self organizing peer-to-peer topologies, and combinations thereof. Components utilized for such a system may depend at least in part upon the type of network and/or environment selected. Network 140 may utilize any suitable protocol, such as TCP/IP, OSI, FTP, UPnP, NFS, CIFS, and AppleTalk. Communication over the network may be enabled by wired or wireless connections, and combinations thereof.

System 100 in certain embodiments is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 1. Thus, the depiction of system 100 in FIG. 1 should be taken as being illustrative in nature, and not limiting to the scope of the disclosure.

Figure 2:
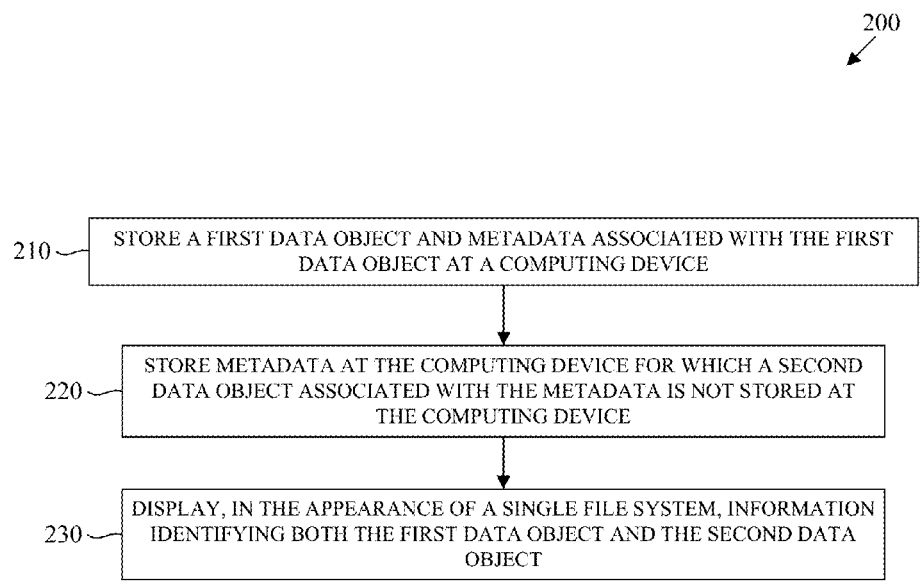
FIG. 2 is a flowchart depicting example operations of a client computing device in accordance with a first embodiment.

FIG. 2 is a flowchart depicting example operations 200 of client computing device 110 in accordance with a first embodiment. The example operations show one or more steps that may be used to facilitate the integration of local and remote data storage.

In operation 210, a first data object and metadata associated with the first data object are stored at a computing device. For example, the first data object and associated metadata may be stored in storage element 116 of client computing device 110. The first data object may be information representing any type of data, such as an image encoded using any suitable image encoding algorithm (e.g., JPEG, TIFF, GIF, etc.), a video encoded using any suitable video encoding algorithm (e.g., MPEG, H.264, VC-2, etc.), a document (e.g., a Word™ document, a WordPerfect™ document, an Excel™ spreadsheet, etc.), or any other data type. The data object is associated with metadata, where the metadata may be any suitable data indicating one or more characteristics of the data object. For example, the metadata may indicate a date and time the data object was created or last modified, a name of a user who created and/or modified the data object, a version of the data object, etc. In some cases, the metadata may be specific to the type of data represented by the data object. For example, the metadata for an image file may indicate image properties such as the number of pixels in the image, the resolution of the image, the type of camera used to acquire the image, etc, whereas metadata for a Word™ document may indicate document properties such as the number of words, lines, and paragraphs in the document.

In some embodiments, the first data object and associated metadata may be synchronized with remote computing system 130. In this fashion, the first data object and associated metadata, while being stored at client computing device 110, may also be stored at remote computing system 130. For example, the first data object may be stored in object data storage element 138 and the associated metadata may be stored in metadata storage element 136. Accordingly, changes to the first data object or associated metadata at client computing device 110 may be communicated to remote computing system 130, and similarly, changes to the first data object and associated metadata stored at remote computing system 130 (e.g., changes made by client computing device 120) may be communicated to client computing device 110.

In operation 220, metadata is stored at the computing device for which a second data object associated with the metadata is not stored at the computing device. For example, metadata associated with the second data object may be stored in storage element 116 of client computing device 110, whereas the second data object is not stored in client computing device 110.

In some embodiments, the second data object may be stored remotely and not synchronized. For example, the second data object may be stored in object data storage element 138 of remote computing system 130. Further, the metadata associated with the second data object may be synchronized. For example, the metadata associated with the second data object may be stored in storage element 116 of client computing device 110 as well as metadata storage element 136 of remote computing system 130. Accordingly, changes to the metadata associated with the second object made at client computing device 110 may be communicated to remote computing system 130, and similarly, changes to the metadata associated with the second data object stored at remote computing system 130 (e.g., changes made by client computing device 120) may be communicated to client computing device 110.

In operation 230, information identifying both the first data object and the second data object is displayed in the appearance of a single file system. For example, client computing device 110 may display via user interface 118 information identifying both the first data object stored in storage element 116 at client computing device 110 as well as the second data object stored in object data storage element 138 of remote computing system 130. In some embodiments, client computing device 110 may use the metadata associated with the data objects to display the information identifying the data objects. For example, client computing device 110 may use the metadata stored in storage element 116 associated with each of the first and second data objects. By displaying such information in the appearance of a single file system, a user of client computing device 110 may advantageously identify both locally and remotely stored data in the same graphical window, thereby increasing the compactness of the user interface and increasing overall usability of the device.

Figure 7A:
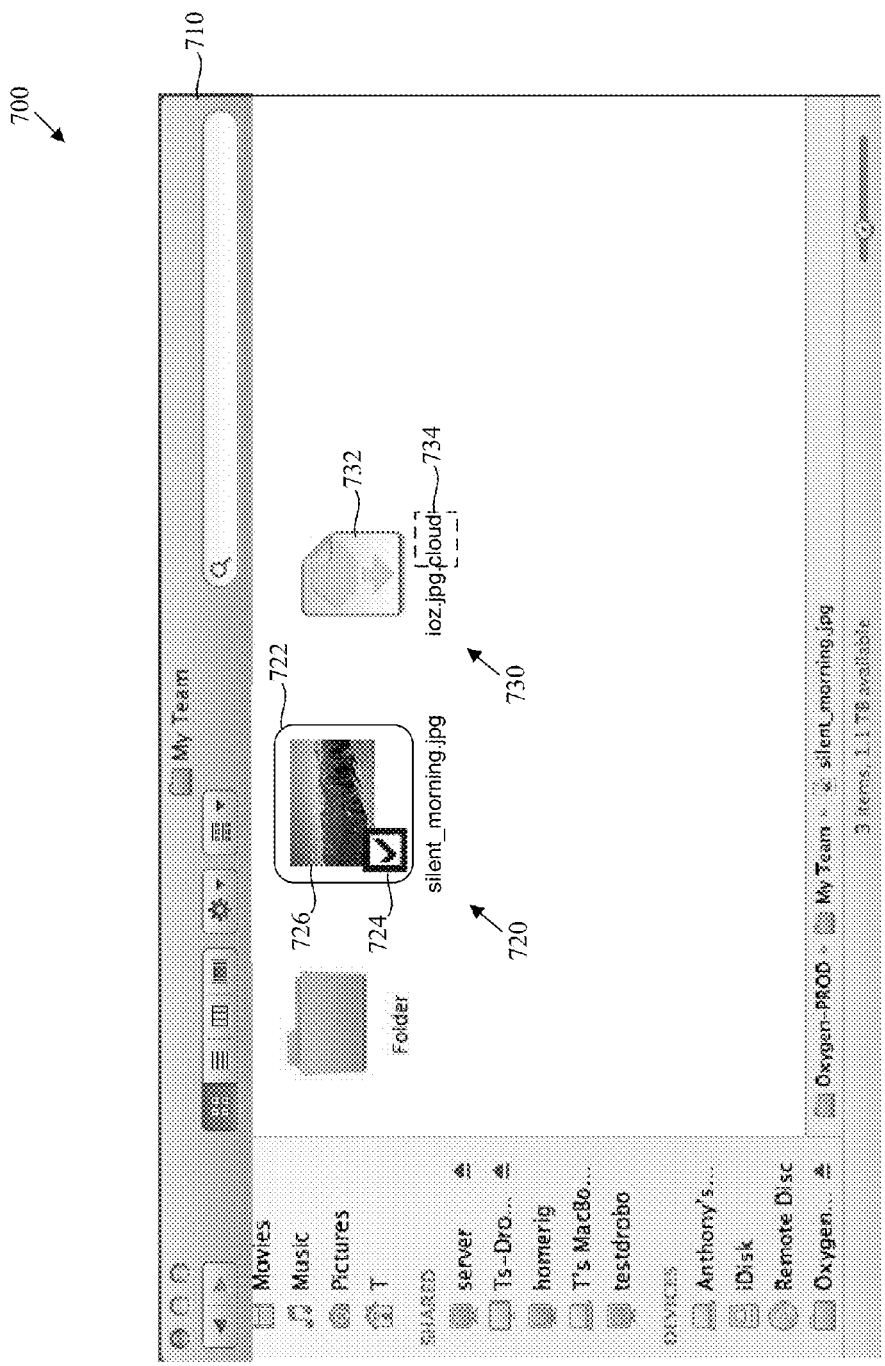
FIG. 7A shows a simplified graphical user interface in which synchronized and unsynchronized data objects are displayed in accordance with a first embodiment.

Turning briefly to FIG. 7A, FIG. 7A shows a simplified graphical user interface (GUI) 700 in which synchronized and unsynchronized data objects are displayed in accordance with a first embodiment. Within a single graphical window 710, information 720 identifying a first data object is displayed, and information 730 identifying a second data object is simultaneously displayed. The graphical window 710 may be displayed by, for example, user interface 118 of client computing device 110. The first data object and metadata associated with the first data object may be stored at client computing device 110. The second data object may not be stored at client computing device 110, but metadata associated with the second data object may be stored at client computing device 110.

Information 720 and information 730 are provided in the appearance of a single file system, although the actual file system in which the first and second data objects is stored may the same or different. For example, the file system used by client computing device may be a FAT32 file system, whereas the file system used by remote computing system 130, at which the second data object is stored, may be an NTFS file system. The actual file systems used may be any suitable file systems, such as FAT32, NTFS, OCF32, VMFS3, etc.

Returning back to FIG. 2, it should be appreciated that the specific operations illustrated in FIG. 2 provide a particular method that may be executed by a client computing device, according to certain embodiments of the present invention. Other sequences of operations may also be performed according to alternative embodiments. For example, alternative embodiments of the present invention may perform the operations outlined above in a different order. Moreover, the individual operations illustrated in FIG. 2 may include multiple sub-operations that may be performed in various sequences as appropriate to the individual operations. Furthermore, additional operations may be added or existing operations removed depending on the particular applications. One of ordinary skill in the art would recognize and appreciate many variations, modifications, and alternatives.

Figure 3:
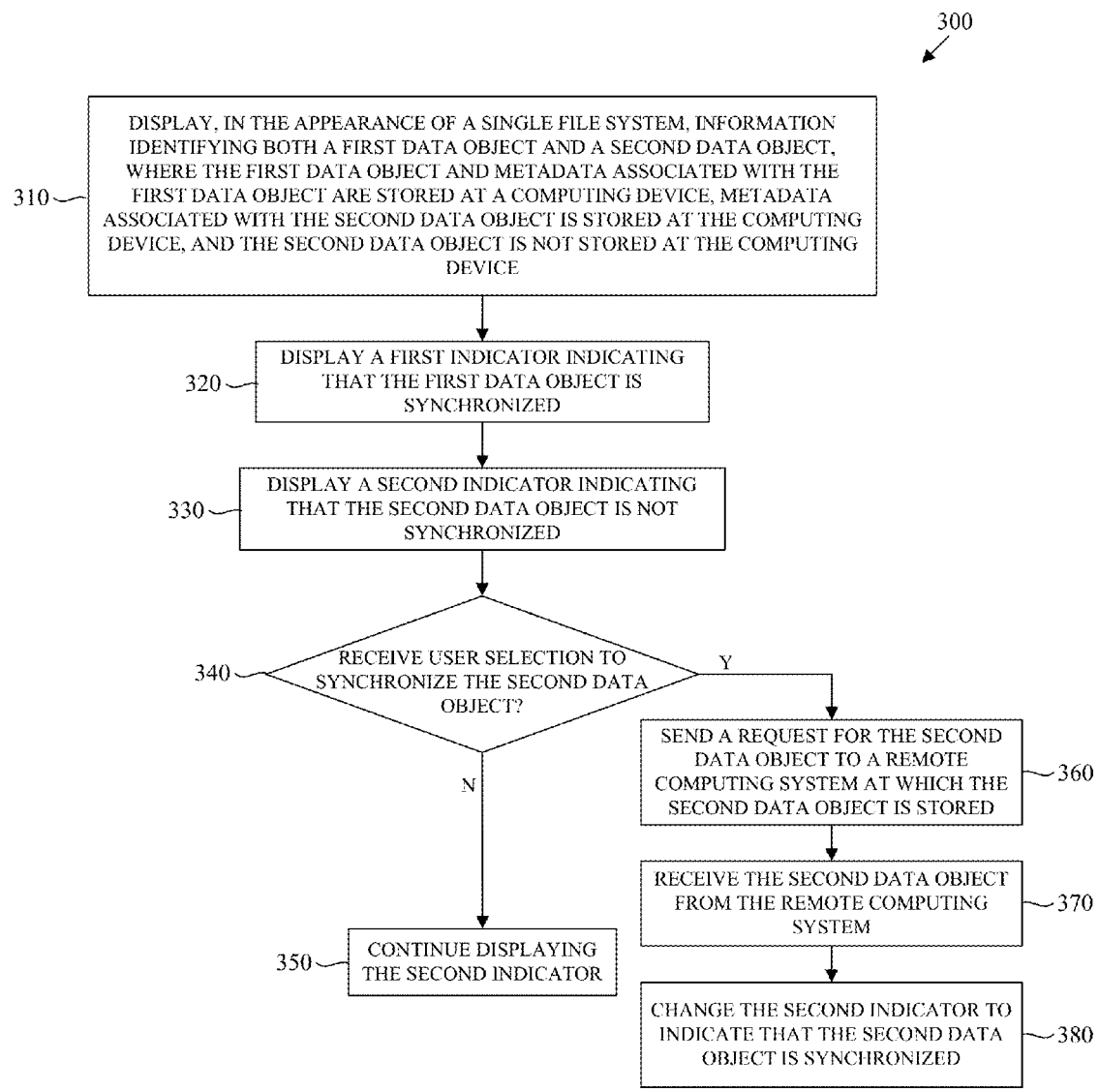
FIG. 3 is a flowchart depicting example operations of a client computing device in accordance with a second embodiment.

FIG. 3 is a flowchart depicting example operations 300 of client computing device 110 in accordance with a second embodiment. The example operations show one or more steps that may be used to synchronize an unsynchronized data object.

In operation 310, information identifying both a first data object and a second data object may be displayed in the appearance of a single file system. For example, with reference to FIG. 7A, information 720 identifying a first data object is displayed, and information 730 identifying a second data object is simultaneously displayed in a single graphical window. The first data object and metadata associated with the first data object are stored at a computing device such as client computing device 110 (FIG. 1), and metadata associated with the second data object is stored at the computing device. The second data object is not stored at the computing device, but in some embodiments may be stored at remote computing system 130 (FIG. 1).

In operation 320, a first indicator is displayed indicating that the first data object is synchronized. For example, with reference to FIG. 7A, first indicator 722 indicates that the first data object is stored not only on client computing device 110 but also on remote computing system 130. First indicator 722 may assume any suitable form for indicating to the user of client computing device 110 that the first data object is stored on client computing device 110. For example, first indicator 722 may include a checkbox 724 or other suitable graphical symbol, such as a circle, diamond, or other graphical element. In some embodiments, the first indicator 722 may include a graphical image 726 representative of the content of the first data object. For example, if the first data object is an image file, the graphical image may be a thumbnail of the image. The thumbnail of the image may be generated using the first data object stored in storage element 116 of client computing device 110. Graphical image 726 need not be representative of the content of the first data object, but in some embodiments may be an arbitrary image indicating that the first data object is stored on client computing device 110.

In operation 330, a second indicator is displayed indicating that the second data object is not synchronized. For example, with reference to FIG. 7A, second indicator 732 indicates that the second data object is not stored on client computing device 110 but rather is stored on remote computing system 130. Like first indicator 722, second indicator 732 may assume any suitable form for indicating to the user of client computing device 110 that the second data object is not stored on client computing device 110, and may include any suitable graphical symbols and/or images. For example, as shown in FIG. 7A, second indicator 732 may be an image of a cloud. Second indicator 732 may be a default image stored in storage element 116 that is displayed any time the second data object is not synchronized. In some embodiments, a file extension 734 may operate as the second indicator. For example, a default file extension such as "cloud" (or any other suitable text or alphanumeric sequence) may be appended to the actual filename. The filename of the second data object may be generated from the metadata associated with the second data object and stored in storage element 116 of client computing device 110. The default file extension may then be added to the filename and displayed to the user.

Figure 7B:
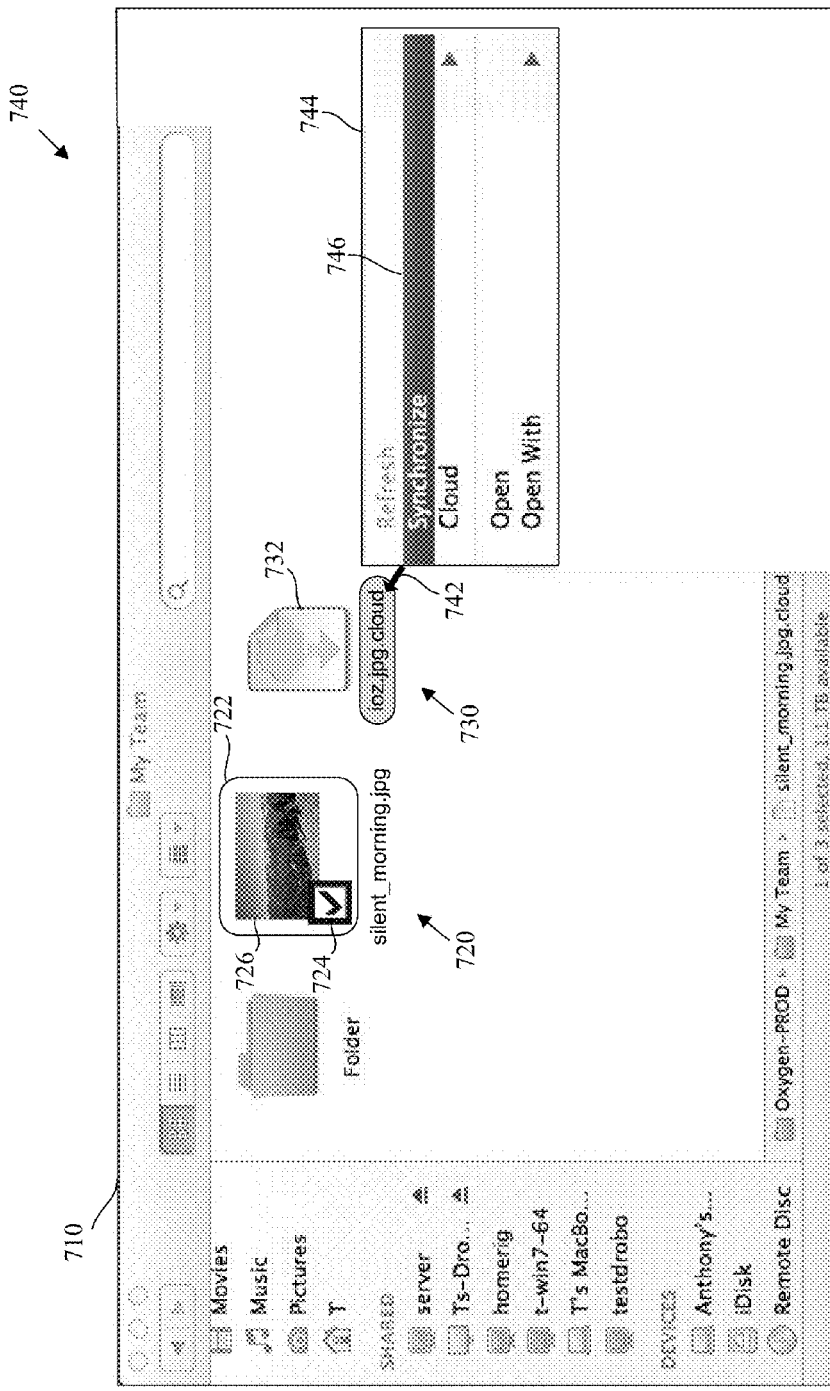
FIG. 7B shows a simplified graphical user interface in which a user has selected to synchronize a second data object that is not stored at client computing device.

In operation 340, a determination is made as to whether a user selection to synchronize the second data object is received. For example, a user may use user interface 118 to communicate a user selection to client computing device 110, whereby processor 114 may determine whether or not the user made a selection to synchronize the second data object. Turning briefly to FIG. 7B, FIG. 7B shows a simplified GUI 740 in which a user has selected to synchronize a second data object that is not stored at client computing device 110. In this embodiment, a user has used pointer 742 to select information 730 identifying the second data object and is subsequently provided with a context menu 744 including a synchronize option 746. The user may then select synchronize option 746 using pointer 742 to provide a selection to synchronize the second data object. A person of ordinary skill in the art would recognize a variety of techniques for receiving receive a user selection, including via a touch-screen device, keyboard shortcuts, menu bars, drop-down lists, etc., and all such techniques are within the scope of the present invention.

In the event that a user selection to synchronize the second data object is not received, processing may continue with operation 350. In operation 350, client computing device 110 may continue displaying the second indicator. For example, with reference to FIG. 7A, client computing device 110 may continue displaying information 730 identifying the second data object.

In the event that a user selection to synchronize the second data object is received, processing may continue with operation 360. In operation 360, a request for the second data object is sent to a remote computing system at which the second data object is stored. For example, where the second data object is stored at remote computing system 130, client computing device 110 may communicate the request to remote computing system 130 via communication interface 112 and network 140. In response to receiving the request for the second data object, remote computing system 130 may locate the second data object and subsequently communicate the second data object to client computing device 110. For example, remote computing system 130 may locate the second data object stored in object data storage element 138 and communicate the second data object to client computing device 110 via communication interface 132 and network 140.

In operation 370, the second data object is received from the remote computing system. For example, client computing device 110 may receive the second data object communicated from remote computing system 130 via communication interface 112. In some embodiments, upon receiving the second data object, client computing device 110 may store the second data object in storage element 116.

Figure 7C:
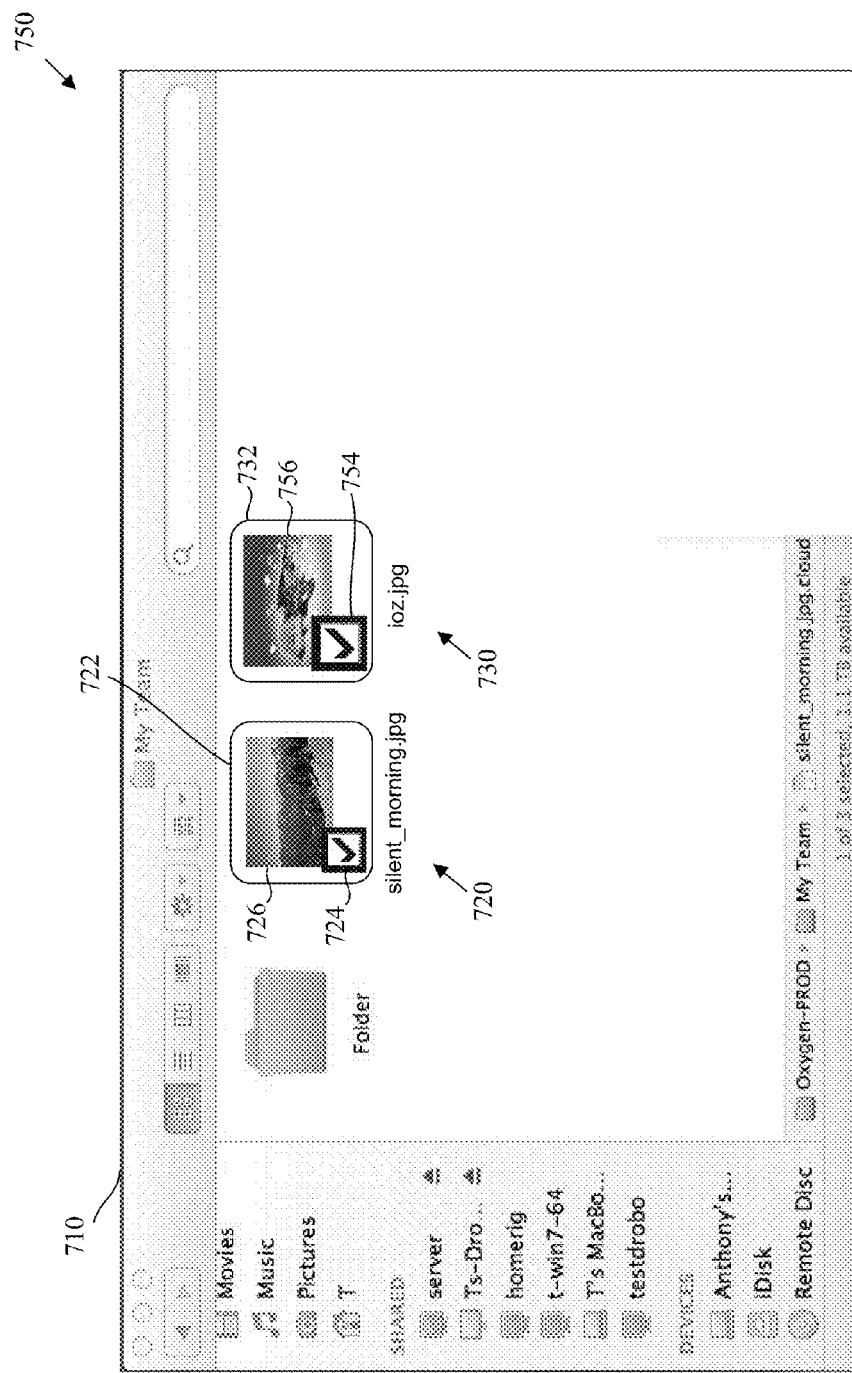
FIG. 7C shows a simplified graphical user interface in which the second indicator is changed to indicate that the second data object is synchronized.

In operation 380, the second indicator is changed to indicate that the second data object is synchronized. For example, client computing device 110 may change a displayed indicator regarding the second data object to indicate that the second data object has been received and stored by client computing device 110. Turning briefly to FIG. 7C, FIG. 7C shows a simplified GUI 750 in which the second indicator 732 is changed to indicate that the second data object is synchronized. In some embodiments, second indicator 732 may include a checkbox 754 similar to checkbox 724, and/or a graphical image 756 similar to graphical image 726. According to some embodiments, an additional filename extension such as "cloud" 734 (FIG. 7A), may be removed to further indicate that the second data object is synchronized.

Returning back to FIG. 3, it should be appreciated that the specific operations illustrated in FIG. 3 provide a particular method that may be executed by a client computing device, according to certain embodiments of the present invention. Other sequences of operations may also be performed according to alternative embodiments. For example, alternative embodiments of the present invention may perform the operations outlined above in a different order. Moreover, the individual operations illustrated in FIG. 3 may include multiple sub-operations that may be performed in various sequences as appropriate to the individual operations. Furthermore, additional operations may be added or existing operations removed depending on the particular applications. One of ordinary skill in the art would recognize and appreciate many variations, modifications, and alternatives.

Figure 4:
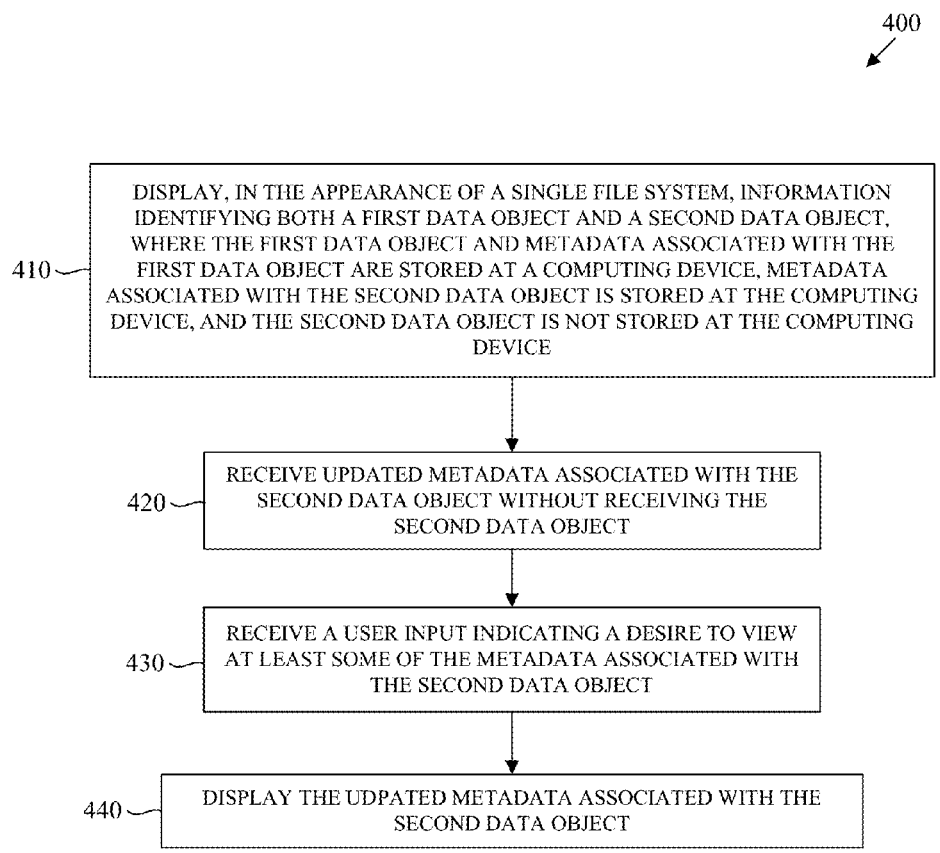
FIG. 4 is a flowchart depicting example operations of a client computing device in accordance with a third embodiment.

FIG. 4 is a flowchart depicting example operations 400 of client computing device 110 in accordance with a third embodiment. The example operations show one or more steps that may be used in the synchronization of metadata according to a first embodiment.

In operation 410, information identifying both a first data object and a second data object may be displayed in the appearance of a single file system. For example, with reference to FIG. 7A, information 720 identifying a first data object is displayed, and information 730 identifying a second data object is simultaneously displayed in a single graphical window. The first data object and metadata associated with the first data object are stored at a computing device such as client computing device 110 (FIG. 1), and metadata associated with the second data object is stored at the computing device. The second data object is not stored at the computing device, but in some embodiments may be stored at remote computing system 130 (FIG. 1).

The metadata associated with the second data object and stored at remote computing system 130 may be modified by an entity other than client computing device 110. For example, the metadata may be modified by a different client computing device such as client computing device 120. In one embodiment, the metadata may be directly modified. For example, the client computing device 120 may access the metadata stored at remote computing system 130 and modify the metadata itself. In another embodiment, the metadata may be indirectly modified. For example, the client computing device 120 may access and/or modify the second data object associated with the metadata, thereby causing the metadata to be modified.

Regardless of how the metadata associated with the second data object and stored at remote computing system 130 is updated or otherwise modified, remote computing system 130 may communicate the updated metadata to client computing device. The metadata may be communicated in one or more of a variety of fashions. For example, remote computing system 130 may detect a change in the metadata and, in response to detecting the change, push the updated metadata to client computing device 110. For another example, client computing device 110 may communicate a request for updated metadata to remote computing system 130, whereby remote computing system 130 may respond with the updated metadata. In this fashion, the metadata associated with the second data object (or analogously the first data object) and stored at client computing device 110 may always be synchronized with the metadata at remote computing system 130. Similarly, in some embodiments, data objects themselves stored at remote computing system 130 may be updated or otherwise modified (e.g., by a user of remote computing system 130, or a user of another client device such as client computing device 120 that has access to the data object), and the updated data objects may be communicated to client computing device 110. In this fashion, like metadata, data objects stored at client computing device 110 may always be synchronized with data objects at remote computing system 130.

In operation 420, the updated metadata associated with the second data object is received without receiving the second data object. For example, client computing device 110 may receive the updated metadata from remote computing system 130 without receiving the second data object. In this fashion, the user of client computing device 110 may advantageously always be able to view the current properties of the second data object stored at remote computing system 130 without necessarily downloading or otherwise acquiring the data object itself. For example, where the second data object or metadata associated with the second data object is manipulated by another device that has access to the data, such as client computing device 120, the user of client computing device 110 may advantageously be able to view such changes.

Figure 8:
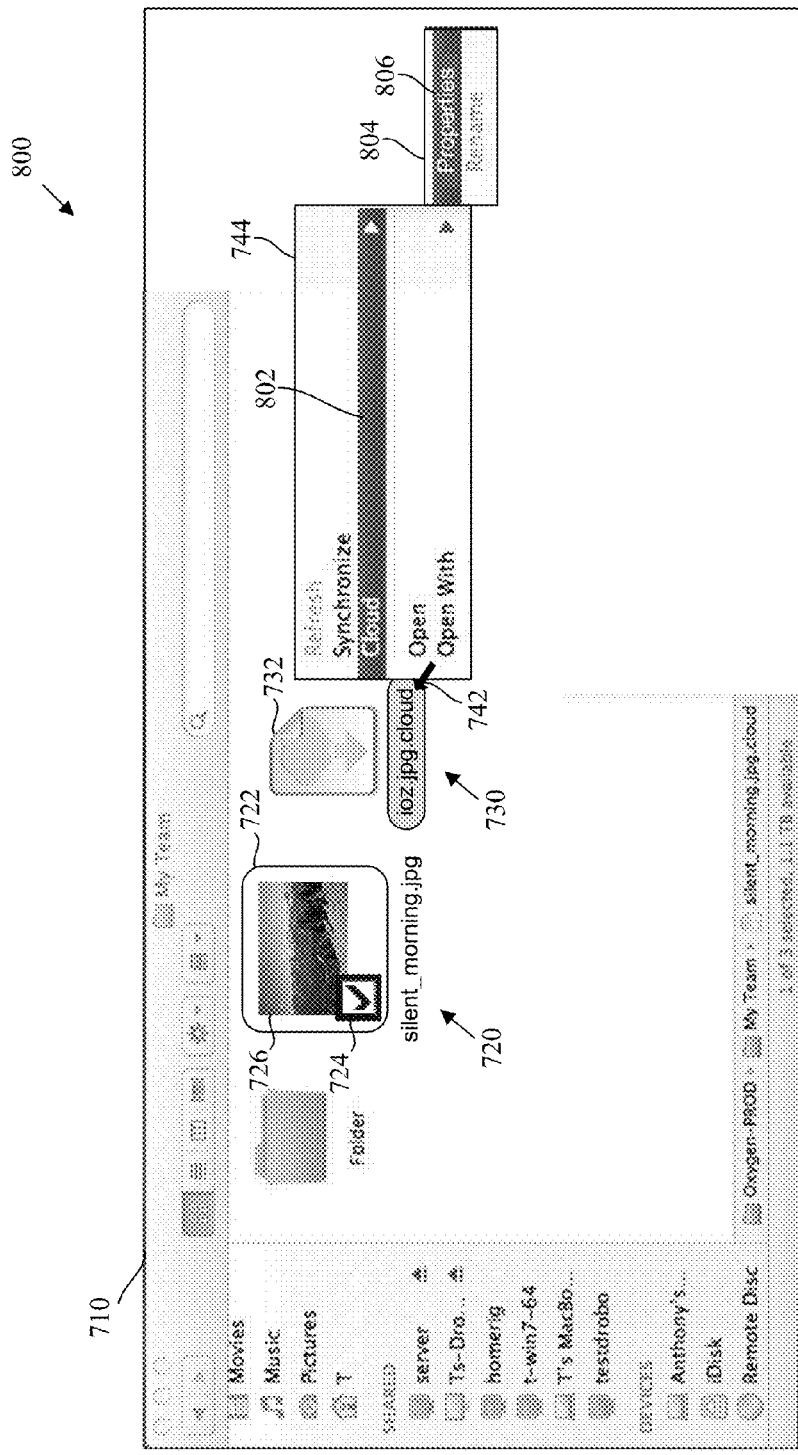
FIG. 8 shows a simplified graphical user interface in which a user has provided a user input indicating a desire to view or manipulate metadata associated with the second data object.

In operation 430, a user input indicating a desire to view at least some of the metadata associated with the second data object may be received. For example, a user may use user interface 118 to communicate a user input to client computing device 110. Turning briefly to FIG. 8, FIG. 8 shows a simplified GUI 800 in which a user has provided a user input indicating a desire to view or manipulate metadata associated with the second data object. GUI 800 is similar to GUI 740 (FIG. 7B), except in this case context menu 744 includes a cloud option 802. In response to a user selection of cloud option 802, an additional context menu 804 is provided that includes a properties option 806. In response to a user selection of properties option 806, a user may access, view, or otherwise manipulate the metadata associated with the second data object. A person of ordinary skill in the art would recognize a variety of techniques for receiving receive a user selection, including via a touch-screen device, keyboard shortcuts, menu bars, drop-down lists, etc., and all such techniques are within the scope of the present invention.

Returning to FIG. 4, in operation 440, the updated metadata associated with the second data object is displayed. For example, the updated metadata may be displayed via user interface 118 of client computing device 110 in response to a user selection of properties option 806 (FIG. 8). In some embodiments, the updated metadata associated with the second data object may also be stored in storage element 116 of client computing device 110. For example, the updated metadata may replace the previously stored metadata associated with the second data object.

It should be appreciated that the specific operations illustrated in FIG. 4 provide a particular method that may be executed by a client computing device, according to certain embodiments of the present invention. Other sequences of operations may also be performed according to alternative embodiments. For example, alternative embodiments of the present invention may perform the operations outlined above in a different order. Moreover, the individual operations illustrated in FIG. 4 may include multiple sub-operations that may be performed in various sequences as appropriate to the individual operations. Furthermore, additional operations may be added or existing operations removed depending on the particular applications. One of ordinary skill in the art would recognize and appreciate many variations, modifications, and alternatives.

Figure 5:
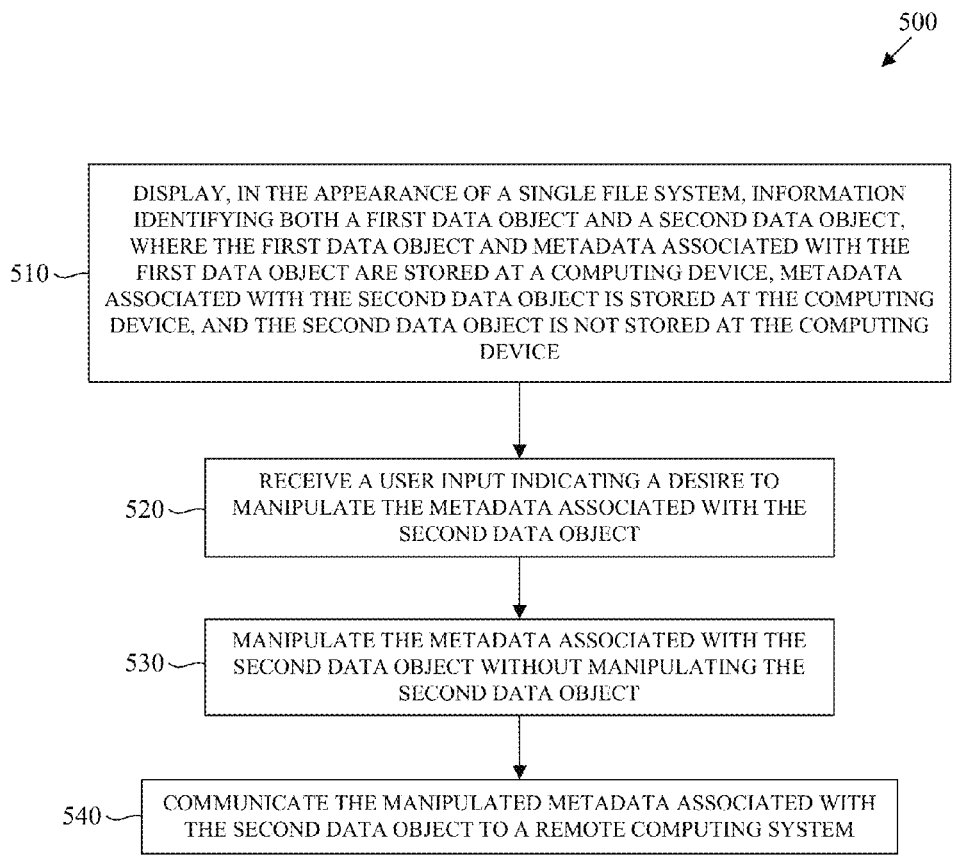
FIG. 5 is a flowchart depicting example operations of a client computing device in accordance with a fourth embodiment.

FIG. 5 is a flowchart depicting example operations 500 of client computing device 110 in accordance with a fourth embodiment. The example operations show one or more steps that may be used in the synchronization of metadata according to a second embodiment.

In operation 510, information identifying both a first data object and a second data object may be displayed in the appearance of a single file system. For example, with reference to FIG. 7A, information 720 identifying a first data object is displayed, and information 730 identifying a second data object is simultaneously displayed in a single graphical window. The first data object and metadata associated with the first data object are stored at a computing device such as client computing device 110 (FIG. 1), and metadata associated with the second data object is stored at the computing device. The second data object is not stored at the computing device, but in some embodiments may be stored at remote computing system 130 (FIG. 1).

In operation 520, a user input indicating a desire to manipulate the metadata associated with the second data object is received. For example, a user may indicate a desire to manipulate the metadata associated with the second data object using user interface 118 of client computing device 110. Turning briefly to FIG. 8, FIG. 8 shows a simplified GUI 800 in which a user has provided a user input indicating a desire to view or manipulate metadata associated with the second data object. As mentioned in the previous discussion on FIG. 8 regarding operation 430 of FIG. 4, GUI 800, in response to a user selection of cloud option 802, an additional context menu 804 is provided that includes a properties option 806. In response to a user selection of properties option 806, a user may access, view, or otherwise manipulate the metadata associated with the second data object. In this case, the user may select properties option 806 to indicate a desire to manipulate the metadata associated with the second data object.

In operation 530, the metadata associated with the second data object is manipulated without manipulating the second data object. For example, processor 114 may manipulate the metadata stored in storage element 116 as requested by the user, and may do so without manipulating the second data object stored on remote computing system 130. The user may make any suitable type of manipulation, such as changing a name or tag defined in the metadata. As a result of the user manipulation of the metadata, manipulated metadata associated with the second data object may be generated.

In operation 540, the manipulated metadata associated with the second data object is communicated to a remote computing system. For example, the metadata manipulated in accordance with operation 530 may be communicated via communication interface 112 and network 140 to remote computing system 130. In response to receiving the manipulated metadata, remote computing system may replace any currently stored metadata associated with the second data object with the manipulated metadata. In this fashion, changes made to the metadata made by client computing device 110 may advantageously be provided for viewing or consumption by other devices that have access to the metadata, such as client computing device 120.

The manipulated metadata may be communicated to remote computing system 130 in one or more of a variety of fashions. For example, client computing device 110 may detect changes in the metadata and, in response to detecting the change, push the updated metadata to remote computing system 130. For another example, remote computing system 130 may communicate a request for updated metadata to client computing device 110, whereby client computing device 110 may respond with the manipulated metadata. In one or more of these fashions, the metadata associated with the second data object (or analogously the first data object) and stored at client computing device 110 may always be synchronized with the metadata at remote computing system 130. Similarly, in some embodiments, data objects themselves stored at client computing device 110 may be manipulated (e.g., by a user of client computing device), and the manipulated data objects may be communicated to remote computing system 130. In this fashion, like metadata, data objects stored at client computing device 110 may always be synchronized with data objects at remote computing system 130.

It should be appreciated that the specific operations illustrated in FIG. 5 provide a particular method that may be executed by a client computing device, according to certain embodiments of the present invention. Other sequences of operations may also be performed according to alternative embodiments. For example, alternative embodiments of the present invention may perform the operations outlined above in a different order. Moreover, the individual operations illustrated in FIG. 5 may include multiple sub-operations that may be performed in various sequences as appropriate to the individual operations. Furthermore, additional operations may be added or existing operations removed depending on the particular applications. One of ordinary skill in the art would recognize and appreciate many variations, modifications, and alternatives.

Figure 6:
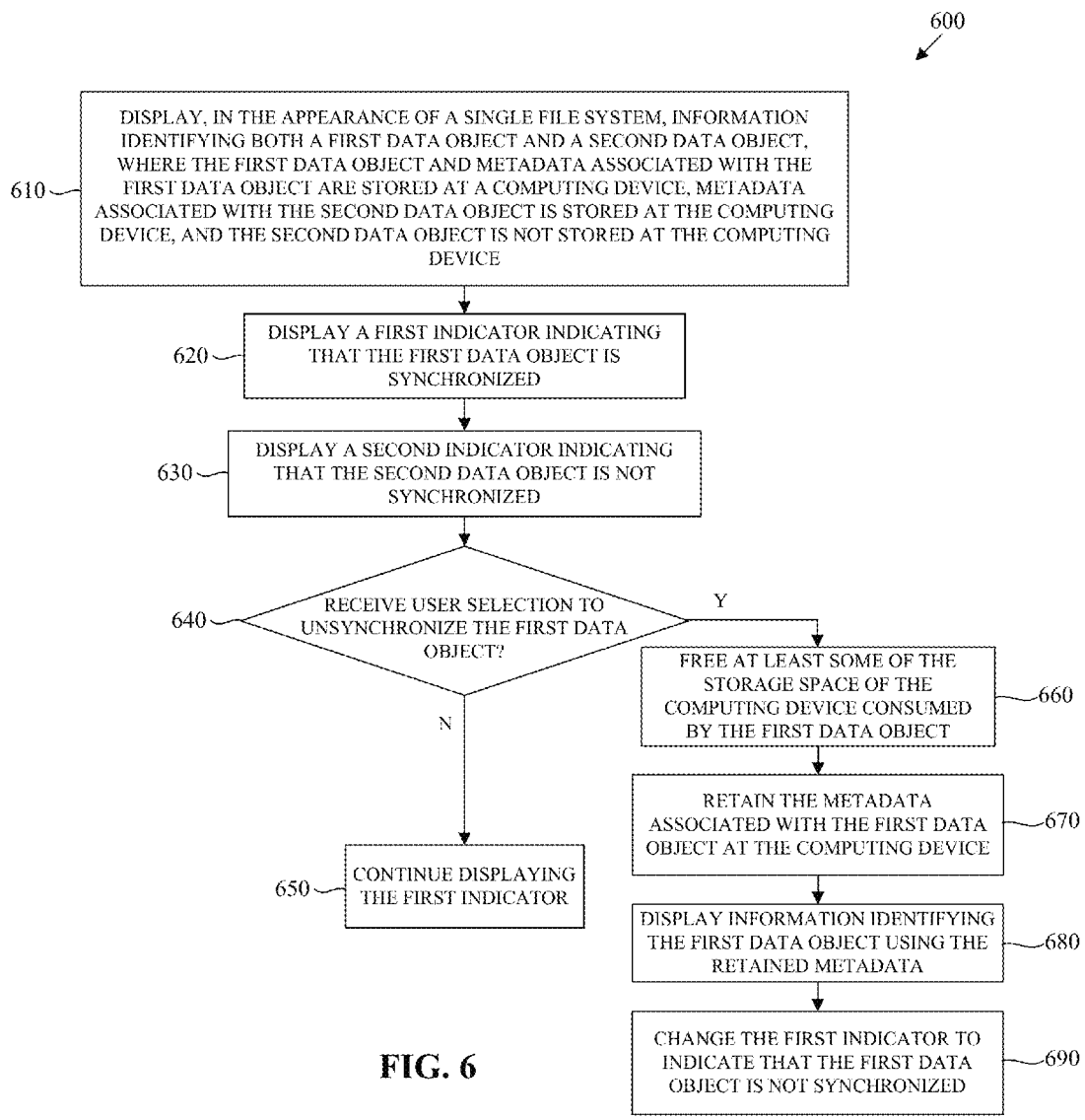
FIG. 6 is a flowchart depicting example operations of a client computing device in accordance with a fifth embodiment.

FIG. 6 is a flowchart depicting example operations 600 of client computing device 110 in accordance with a fifth embodiment. The example operations show one or more steps that may be used to unsynchronize a synchronized data object.

In operation 610, information identifying both a first data object and a second data object may be displayed in the appearance of a single file system. For example, turning briefly to FIG. 9A, FIG. 9A, similar to FIG. 7A, shows a simplified GUI 900 in which synchronized and unsynchronized data objects are displayed in accordance with a second embodiment. In this case, within single graphical window 910, information 920 identifying a first data object is displayed, and information 930 identifying a second data object is simultaneously displayed. The first data object and metadata associated with the first data object are stored at a computing device such as client computing device 110 (FIG. 1), and metadata associated with the second data object is stored at the computing device. The second data object is not stored at the computing device, but in some embodiments may be stored at remote computing system 130 (FIG. 1).

Figure 9A:
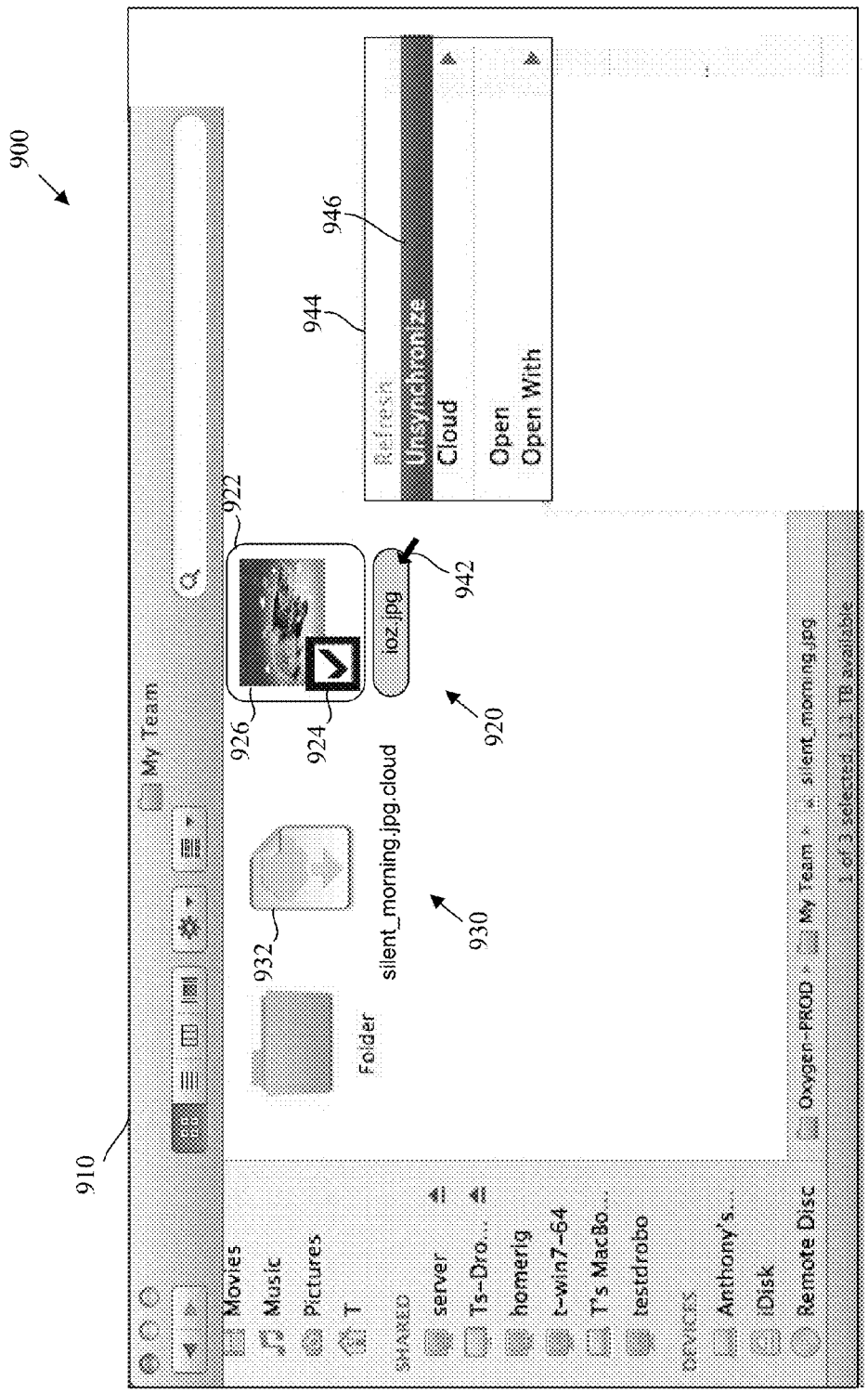
FIG. 9A shows a simplified graphical user interface in which synchronized and unsynchronized data objects are displayed in accordance with a second embodiment.

Operations 620 and 630 are similar to operations 320 and 330, except that in this case, with reference to FIG. 9A, first indicator 922 indicates that the first data object is stored not only on client computing device 110 but also on remote computing system 130, where first indicator 922 may include a checkbox 924 and/or a graphical image 926. Further, second indicator 932 indicates that the second data object is not stored on client computing device 110 but rather is stored on remote computing system 130.

In operation 640, a determination is made as to whether a user selection to unsynchronize the first data object is received. This operation is similar to operation 340 discussed with reference to FIG. 3. However, in this case, a determination is made as to whether a user chooses to unsynchronize rather than synchronize a data object. For example, with reference to FIG. 9A, a user may use pointer 942 to select information 920 identifying the first data object. In response, a context menu 944 including an unsynchronize option 946 may be displayed. The user may then select unsynchronize option 946 using pointer 942 to provide a selection to unsynchronize the first data object. A person of ordinary skill in the art would recognize a variety of techniques for receiving receive a user selection, including via a touch-screen device, keyboard shortcuts, menu bars, drop-down lists, etc., and all such techniques are within the scope of the present invention.

Returning to FIG. 6, in the event that a user selection to unsynchronize the second data object is not received, processing may continue with operation 650. In operation 650, client computing device 110 may continue displaying the first indicator. For example, with reference to FIG. 9A, client computing device 110 may continue displaying first indicator 922.

In the event that a user selection to unsynchronize the first data object is received, processing may continue with operation 660. In operation 660, at least some of the storage space of the computing device consumed by the first data object is freed. For example, at least some of the storage space of storage element 116 of client computing device 110 is freed. The data does not necessarily need to be deleted, but rather made available for other processes or applications executing on client computing device 110. In this fashion, storage space on client computing device 110 may advantageously be made available to a user of client computing device 110.

In operation 670, the metadata associated with the first data object is retained at the computing device. For example, the metadata associated with first data object may be retained in storage element 116. By retaining the metadata, client computing device 110 may advantageously be able to display information concerning the first data object even though the first data object is not stored at client computing device 110.

Figure 9B:
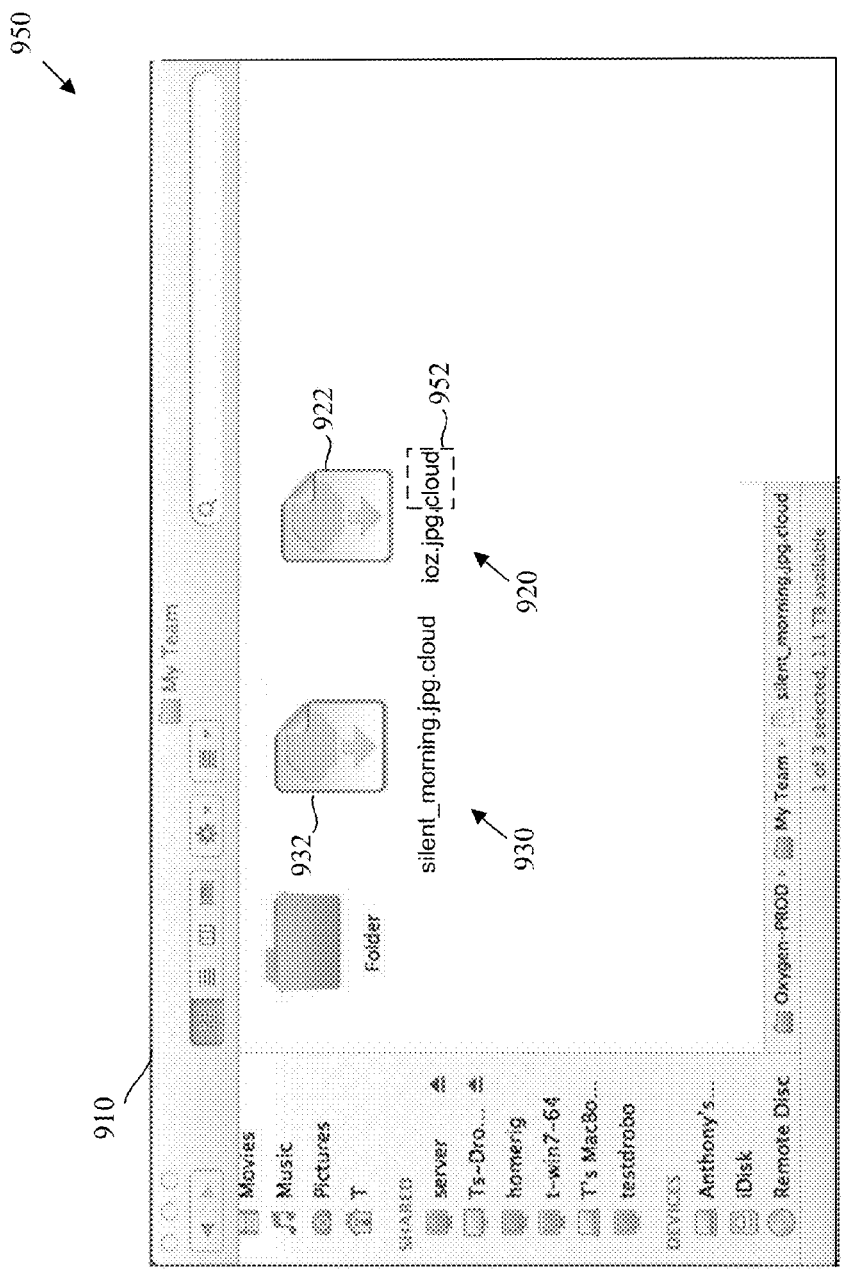
FIG. 9B shows a simplified graphical user interface in which the first indicator is changed to indicate that the first data object is unsynchronized.

In operation 680, information identifying the first data object is displayed using the retained metadata. For example, turning briefly to FIG. 9B, FIG. 9B shows a simplified GUI 950 in which the first indicator 922 is changed to indicate that the first data object is unsynchronized. The retained metadata stored in storage element 116 may be used to display information 920 identifying the first data object and/or other characteristics of the first data object upon receiving a user indication to view or modify the metadata.

In operation 690, the first indicator is changed to indicate that the first data object is not synchronized. For example, client computing device 110 may change a displayed indicator regarding the first data object to indicate that the first data object has been deleted at client computing device 110 but the metadata associated with the first data object has been retained. Turning briefly to FIG. 9B, FIG. 9B shows a simplified GUI 950 in which the first indicator 922 is changed to indicate that the first data object is unsynchronized. First indicator 922 may thus be similar to second indicator 932. According to some embodiments, an additional filename extension such as "cloud" 952 may be added to further indicate that the first data object is unsynchronized.

Returning back to FIG. 6, it should be appreciated that the specific operations illustrated in FIG. 6 provide a particular method that may be executed by a client computing device, according to certain embodiments of the present invention. Other sequences of operations may also be performed according to alternative embodiments. For example, alternative embodiments of the present invention may perform the operations outlined above in a different order. Moreover, the individual operations illustrated in FIG. 6 may include multiple sub-operations that may be performed in various sequences as appropriate to the individual operations. Furthermore, additional operations may be added or existing operations removed depending on the particular applications. One of ordinary skill in the art would recognize and appreciate many variations, modifications, and alternatives.

Figure 10:
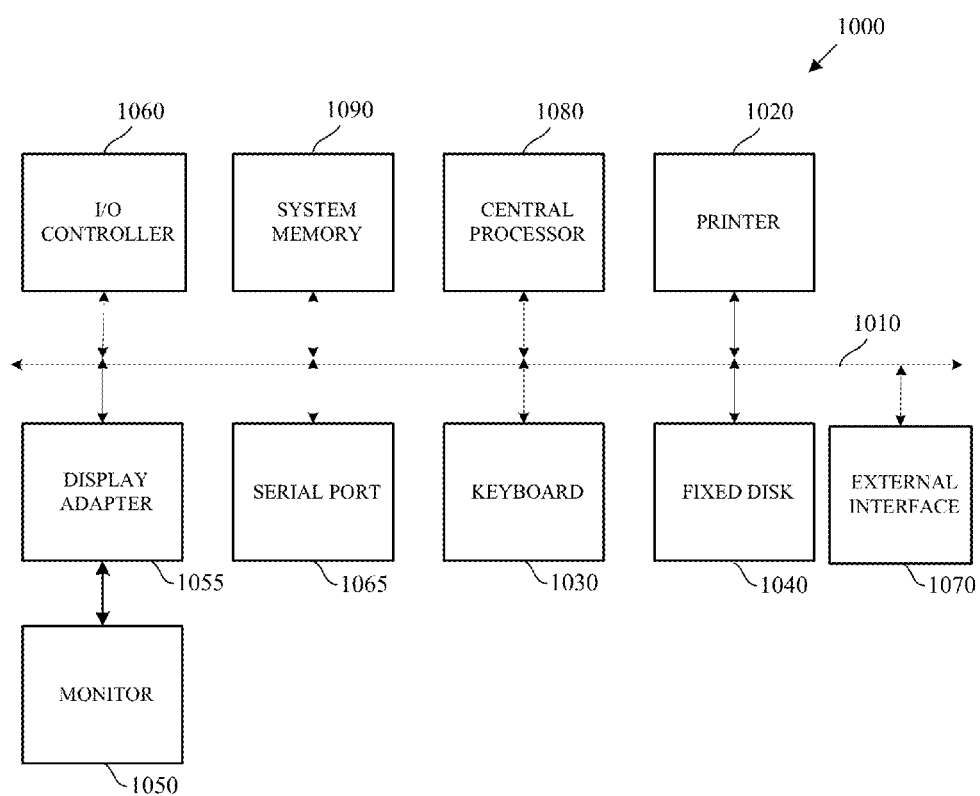
FIG. 10 is a diagram of a computer apparatus according to some embodiments.

FIG. 10 is a diagram of a computer apparatus 1000 according to some embodiments. The various elements in the previously described system diagram (e.g., one or more client computing devices 110-120, and/or remote computing system 130) may use any suitable number of subsystems in the computer apparatus to facilitate the functions described herein. Examples of such subsystems or components are shown in FIG. 10. The subsystems shown in FIG. 10 are interconnected via a system bus 1010. Additional subsystems such as a printer 1020, keyboard 1030, fixed disk 1040 (or other memory comprising tangible, non-transitory computer-readable media), monitor 1050, which is coupled to display adapter 1055, and others are shown. Peripherals and input/output (I/O) devices (not shown), which couple to I/O controller 1060, can be connected to the computer system by any number of means known in the art, such as serial port 1065. For example, serial port 1065 or external interface 1070 can be used to connect the computer apparatus to a wide area network such as the Internet, a mouse input device, or a scanner. The interconnection via system bus allows the central processor 1080 to communicate with each subsystem and to control the execution of instructions from system memory 1090 or the fixed disk 1040, as well as the exchange of information between subsystems. The system memory 1090 and/or the fixed disk 1040 may embody a tangible, non-transitory computer-readable medium.

The software components or functions described in this application may be implemented as software code to be executed by one or more processors using any suitable computer language such as, for example, Java, C++ or Perl using, for example, conventional or object-oriented techniques. The software code may be stored as a series of instructions, or commands on a computer-readable medium, such as a random access memory (RAM), a read-only memory (ROM), a magnetic medium such as a hard-drive or a floppy disk, or an optical medium such as a CD-ROM. Any such computer-readable medium may also reside on or within a single computational apparatus, and may be present on or within different computational apparatuses within a system or network.

The present invention can be implemented in the form of control logic in software or hardware or a combination of both. The control logic may be stored in an information storage medium as a plurality of instructions adapted to direct an information processing device to perform a set of steps disclosed in embodiments of the present invention. Based on the disclosure and teachings provided herein, a person of ordinary skill in the art will appreciate other ways and/or methods to implement the present invention.

The use of the terms "a" and "an" and "the" and similar referents in the context of describing embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope unless otherwise claimed. No language in the specification should be construed as indicating any non-claimed element as essential to the practice of at least one embodiment.

Preferred embodiments are described herein, including the best mode known to the inventors. Variations of those preferred embodiments may become apparent to those of ordinary skill in the art upon reading the foregoing description. The inventors expect skilled artisans to employ such variations as appropriate, and the inventors intend for embodiments to be constructed otherwise than as specifically described herein. Accordingly, suitable embodiments include all modifications and equivalents of the subject matter recited in the claims appended hereto as permitted by applicable law. Moreover, any combination of the above-described elements in all possible variations thereof is contemplated as being incorporated into some suitable embodiment unless otherwise indicated herein or otherwise clearly contradicted by context. The scope of the invention should, therefore, be determined not with reference to the above description, but instead should be determined with reference to the pending claims along with their full scope or equivalents.

What is claimed is:

1. A method comprising:
storing a first data object and corresponding first metadata at a computing device, wherein the first data object and the first metadata are synchronized respectively with a first remote data object and corresponding first remote metadata at a remote computing device;
storing second metadata without storing a second data object corresponding to the second metadata at the computing device, wherein the second metadata is synchronized with a second remote metadata that corresponds to second remote data object at the remote computing device;
displaying, in the appearance of a single file system, information identifying the first data object indicating that both the first data object and the first metadata are stored at the computing device, and information identifying the second data object indicating that the second data object is not stored at the computing device but the second metadata corresponding to the second data object is stored at the computing device, wherein the first data object and the second data object correspond, respectively, to two separate and different files;
receiving a user request at the computing device to selectively synchronize the second data object independently of the first data object in the single file system when the second data object is not stored at the computing device;
in response to receiving the user request to synchronize the second data object:
accessing the second remote data object from the remote computing system; and
storing the second remote data object as the second data object at the computing device, wherein the second metadata and the second data object being stored at the computing device are synchronized respectively with the second remote metadata and the second remote data object at the remote computing device;
receiving a user selection to selectively unsynchronize the first data object independently of the second data object in the single file system; and
in response to receiving the user selection to unsynchronize the first data object:

removing the first data object from the computing device to free at least some of the storage space of the computing device consumed by the first data object; and retaining the first metadata associated with the first data object on the computing device after removing the first data object from the computing device.

2. The method of claim 1, further comprising displaying, in the appearance of the single file system, a first indicator indicating that the first data object is stored at the computing device and a second indicator different from the first indicator indicating that the second data object is not stored at the computing device.

3. The method of claim 1, further comprising:
displaying, in the appearance of the single file system, information identifying the first data object after freeing at least some of the storage space of the computing device consumed by the first data object.

4. The method of claim 1, wherein the first metadata is retained at the computing device after the first data object is unsynchronized.

5. The method of claim 1, further comprising:
receiving updated metadata for the second data object without receiving the second data object; and
displaying, in the appearance of the single file system, information identifying the second data object based on the updated metadata.

6. The method of claim 1, further comprising:
receiving a user selection to manipulate the second metadata; and
manipulating the second metadata without manipulating the second remote data object.

7. The method of claim 1, further comprising in response to storing the second data object, displaying, in the appearance of the single file system, an indicator indicating that the second data object is stored at the computing device.

8. The method of claim 1, wherein the second data object is always synchronized with the second remote data object stored at a remote computing system in response to receiving a user selection to synchronize the second data object.

9. The method of claim 1, wherein the first metadata is always synchronized with the first remote metadata stored at a remote computing system, and the second metadata is always synchronized with the second remote metadata stored at a remote computing system.

10. The method of claim 1, wherein the information identifying both the first data object and the second data object is displayed within a single graphical window.

11. The method of claim 1, wherein the information identifying the second data object indicating that the second data object is not stored at the computing device but the second metadata corresponding to the second data object is stored at the computing device includes a file extension added to a file name of the second data object.

12. The method of claim 1, wherein the information identifying the first data object indicating that both the first data object and the first metadata are stored at the computing device includes an indicator that is added to an icon representing the first data object.

13. A computing device comprising:
a storage device operable to store a first data object and corresponding first metadata, and operable to store second metadata without storing a second data object corresponding to the second metadata at the computing device, wherein the first data object and the first metadata are synchronized respectively with a first remote data object and corresponding first remote metadata at a remote computing device, and the second metadata is synchronized with second remote metadata that corresponds to a second remote data object at the remote computing device;

a user interface operable to display information to a user of the computing device; and a processor operable to:
cause the display device to display, in the appearance of a single file system, information identifying the first data object indicating that both the first data object and the first metadata are stored at the computing device, and information identifying the second data object indicating that the second data object is not stored at the computing device but the second metadata corresponding to the second data object is stored at the computing device, wherein the first data object and the second data object correspond, respectively, to two separate and different files;

receive a user request to selectively synchronize the second data object independently of the first data object in the single file system when the second data object is not stored at the computing device;

in response to the user request to synchronize the second data object:
access the second remote data object from the remote computing system; and
store the second remote data object as the second data object at the computing device, wherein the second metadata and the second data object being stored at the computing device are synchronized respectively with the second remote metadata and the second remote data object at the remote computing device;

receive a user selection to selectively unsynchronize the first data object independently of the second data object in the single file system; and in response to the user selection to unsynchronize the first data object:
remove the first data object from the computing device to free at least some of the storage space of the computing device consumed by the first data object; and
retain the first metadata associated with the first data object on the computing device after removing the first data object from the computing device.

14. A tangible non-transitory computer readable storage medium having software instructions stored therein that, when executed, cause a computing device to perform operations including:

storing a first data object and corresponding first at a computing device, wherein the first data object and the first metadata are synchronized respectively with a first remote data object and corresponding first remote metadata at a remote computing device;

storing second metadata without storing a second data object corresponding to the second metadata at the computing device, wherein the second metadata is synchronized with a second remote metadata that corresponds to a second remote data object at the remote computing device;

displaying, in the appearance of a single file system, information identifying the first data object indicating that both the first data object and the first metadata are stored at the computing device, and information identifying the second data object indicating that the second data object is not stored at the computing device but the second metadata corresponding to the second data object is stored at the computing device, wherein the first data object and the second data object correspond, respectively, to two separate and different files;

receiving a user request at the computing device to selectively synchronize the second data object independently of the first data object in the single file system when the second data object is not stored at the computing device;

in response to receiving the user request to synchronize the second data object:

accessing the second remote data object from the remote computing system; and storing the second remote data object as the second data object at the computing device, wherein the second metadata and the second data object being stored at the computing device are synchronized respectively with the second remote metadata and the second remote data object at the remote computing device;

receiving a user selection to selectively unsynchronize the first data object independently of the second data object in the single file system; and in response to receiving the user selection to unsynchronize the first data object:

removing the first data object from the computing device to free at least some of the storage space of the computing device consumed by the first data object; and retaining the first metadata associated with the first data object on the computing device after removing the first data object from the computing device.

\* \* \* \* \*